(12) United States Patent
Nomura (10) Patent No.: US 12,506,682 B2
(45) Date of Patent: Dec. 23, 2025

(54) IN-VEHICLE COMMUNICATION SYSTEM INCLUDING ELECTRONIC CONTROL DEVICES EQUIPPED IN VEHICLE, TRANSMISSION PATHS, TRANSMISSION SWITCHES AND NETWORK CONTROL DEVICE MANAGING OPERATION OF TRANSMISSION PATH SWITCHES, AND COMMUNICATION CONTROL METHOD IN SAME

(71) Applicant: HONDA MOTOR CO., LTD., Tokyo (JP)

(72) Inventor: Takumi Nomura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 18/153,545

(22) Filed: Jan. 12, 2023

(65) Prior Publication Data

US 2023/0261975 A1    Aug. 17, 2023

(30) Foreign Application Priority Data

Feb. 15, 2022   (JP) .................................. 2022-021278

(51) Int. Cl.
*H04L 45/24*    (2022.01)
(52) U.S. Cl.
CPC .................... *H04L 45/24* (2013.01)
(58) Field of Classification Search
CPC ............ H04L 45/24; H04W 4/38; H04W 4/48
See application file for complete search history.

(56) References Cited

U.S. PATENT DOCUMENTS 6,381,239 B1 * 4/2002 Atkinson .............. H04M 9/025
370/362
6,526,036 B1 * 2/2003 Uchida ................ H04B 7/2618
370/335

(Continued)

FOREIGN PATENT DOCUMENTS

| CN | 108605004 A | 9/2018 |
| CN | 109951822 A | 6/2019 |

(Continued)

OTHER PUBLICATIONS

Chinese Office Action dated Jul. 5, 2025 issued in corresponding Chinese application No. 202310091855.9; English machine translation included (16 pages).

*Primary Examiner* — Jeong S Park
(74) *Attorney, Agent, or Firm* — Rankin, Hill & Clark LLP (57) ABSTRACT

An in-vehicle communication system includes: electronic control devices; communication transmission paths; a transmission path switch; and a network control device, the network control device includes: a control communication unit performing a control communication with the transmission path switch; and a control communication management unit managing an operation of the control communication in the control communication unit, each of the electronic control device includes: a data communication unit performing a data communication with another of the electronic control devices; and a data communication management unit managing an operation of the data communication in the data communication unit, and the control communication management unit and the data communication management unit manage the respective operations of the control communication unit and the data communication unit, such that the control communication and the data communication are (Continued)

performed on the communication transmission paths in different time periods.

4 Claims, 5 Drawing Sheets

(56) References Cited

U.S. PATENT DOCUMENTS

| | | | |
|---|---|---|---|
| 10,168,418 B1* | 1/2019 | Al-Stouhi | G01S 13/931 |
| 2010/0296494 A1* | 11/2010 | Kanodia | H04L 47/20 |
| | | | 370/336 |
| 2015/0131452 A1* | 5/2015 | Choi | H04W 72/0446 |
| | | | 370/241 |
| 2017/0325221 A1* | 11/2017 | Jalali | H04W 72/0446 |
| 2019/0052677 A1 | 2/2019 | Wakita | |
| 2019/0072641 A1* | 3/2019 | Al-Stouhi | G01S 13/931 |
| 2019/0250611 A1* | 8/2019 | Costin | G05D 1/228 |
| 2021/0204101 A1 | 7/2021 | Kim et al. | |
| 2023/0115290 A1* | 4/2023 | Ogawa | H04L 67/1095 |
| | | | 701/24 |

FOREIGN PATENT DOCUMENTS

| | | |
|---|---|---|
| JP | 2019-062290 A | 4/2019 |
| JP | 2020-65110 A | 4/2020 |

* cited by examiner

IN-VEHICLE COMMUNICATION SYSTEM INCLUDING ELECTRONIC CONTROL DEVICES EQUIPPED IN VEHICLE, TRANSMISSION PATHS, TRANSMISSION SWITCHES AND NETWORK CONTROL DEVICE MANAGING OPERATION OF TRANSMISSION PATH SWITCHES, AND COMMUNICATION CONTROL METHOD IN SAME

INCORPORATION BY REFERENCE

The present application claims priority under 35 U.S.C.§ 119 to Japanese Patent Application No. 2022-021278 filed on Feb. 15, 2022. The content of the application is incorporated herein by reference in its entirety.

BACKGROUND OF THE INVENTION

Field of the Invention

The present invention relates to an in-vehicle communication system, and a communication control method in an in-vehicle communication system.

Description of the Related Art

A software defined network (SDN) technology is known as a technology for enhancing the flexibility and expansibility of a communication network. In the communication network using the SDN technology, generally, a control communication for a network control and a data communication among devices connected with the communication network are configured as physically separate lines.

Japanese Patent Laid-Open No. 2019-62290 discloses a vehicle network system using the software defined network (SDN) technology. The vehicle network system includes a first control device that performs a network control and a second control device that includes a transmission path switch. The first control device and the second control device are connected by two signal lines, and a control message necessary for an open flow control in SDN is divided to the two signal lines, for communication.

SUMMARY OF THE INVENTION

However, a configuration in which devices are connected by a plurality of communication transmission paths causes the increase in the number of communication devices, in addition to the increase in the number of communication transmission paths, so that there can be a disadvantage in cost.

An object of the present invention is to reduce the number of communication transmission paths connecting devices and to realize an in-vehicle communication system at low cost, while enhancing the flexibility and/or expansibility of the communication network.

An aspect of the present invention is an in-vehicle communication system including: a plurality of electronic control devices equipped in a vehicle; a plurality of communication transmission paths; a transmission path switch that switches connection of the communication transmission paths; and a network control device that manages an operation of the transmission path switch, the network control device including: a control communication unit that executes a control communication with the transmission path switch through the communication transmission paths, the control communication being a communication for an operation control of the transmission path switch; and a control communication management unit that manages an operation of the control communication in the control communication unit, each of the electronic control devices including: a data communication unit that performs a data communication with another of the electronic control devices through the communication transmission paths, the data communication being a communication for a data exchange for an operation of the vehicle; and a data communication management unit that manages an operation of the data communication in the data communication unit, in which the control communication management unit and the data communication management unit manage the respective operations of the control communication unit and the data communication unit, such that the control communication and the data communication are performed on the communication transmission paths in different time periods.

In another aspect of the present invention, the control communication management unit and the data communication management unit manage the respective operations of the control communication unit and the data communication unit, such that the control communication and the data communication on the communication transmission paths are executed in mutually different time slots within a frame, the frame being a time period having a predetermined length.

In another aspect of the present invention, the data communication includes a communication of service data, the communication of the service data being performed for the plurality of electronic control devices to provide a predetermined service relevant to the operation of the vehicle, and the data communication management unit manages the operation of the data communication unit, such that the communication of the service data is executed in a time slot that is assigned for each kind of the service.

In another aspect of the present invention, the time slot used for the communication of the service data in the data communication includes a single-purpose time slot and a plural-purpose time slot, the single-purpose time slot being used exclusively for a single kind of the service, the plural-purpose time slot being shared for plural kinds of the service.

In another aspect of the present invention, the time slot used in the data communication includes a general-purpose time slot used for a communication of arbitrary data.

In another aspect of the present invention, the network control device includes a slot management unit that instructs the electronic control devices to change the kind of the service for which the single-purpose time slot or the plural-purpose time slot is used, or to change the number of time slots that are included in the single-purpose time slot or the plural-purpose time slot, depending on a traveling state of the vehicle.

In another aspect of the present invention, when the vehicle has stopped, the slot management unit instructs the electronic control devices to increase the number of time slots that are included in the plural-purpose time slot, compared to when the vehicle is traveling.

In another aspect of the present invention, the slot management unit instructs the electronic control devices to change the kind of the service for which the single-purpose time slot or the plural-purpose time slot is used, or to change the number of time slots that are included in the single-purpose time slot or the plural-purpose time slot, depending on a state of a peripheral environment of the vehicle.

Another aspect of the present invention is a communication control method in an in-vehicle communication system, the in-vehicle communication system including: a plurality of electronic control devices equipped in a vehicle; a plurality of communication transmission paths; a transmission path switch that switches connection of the communication transmission paths; and a network control device that manages an operation of the transmission path switch, the communication control method including: a control communication step in which a first computer included in the network control device executes a control communication with the transmission path switch through the communication transmission paths, the control communication being a communication for an operation control of the transmission path switch; a control communication management step in which the first computer manages an operation of the control communication in the control communication step; a data communication step in which a second computer included in each of the electronic control devices performs a data communication with another of the electronic control devices through the communication transmission paths, the data communication being a communication for a data exchange for an operation of the vehicle; and a data communication management step in which the second computer manages an operation of the data communication in the data communication step, in which, in the control communication management step and the data communication management step, the respective operations of the control communication and the data communication are managed, such that the control communication and the data communication are performed on the communication transmission paths in different time periods.

According to the present invention, it is possible to reduce the number of communication transmission paths connecting devices and to realize an in-vehicle communication system at low cost, while enhancing the flexibility and/or expansibility of the communication network.

DETAILED DESCRIPTION OF THE PREFERRED EMBODIMENTS

An embodiment of the present invention will be described below with reference to the drawings.

Figure 1:
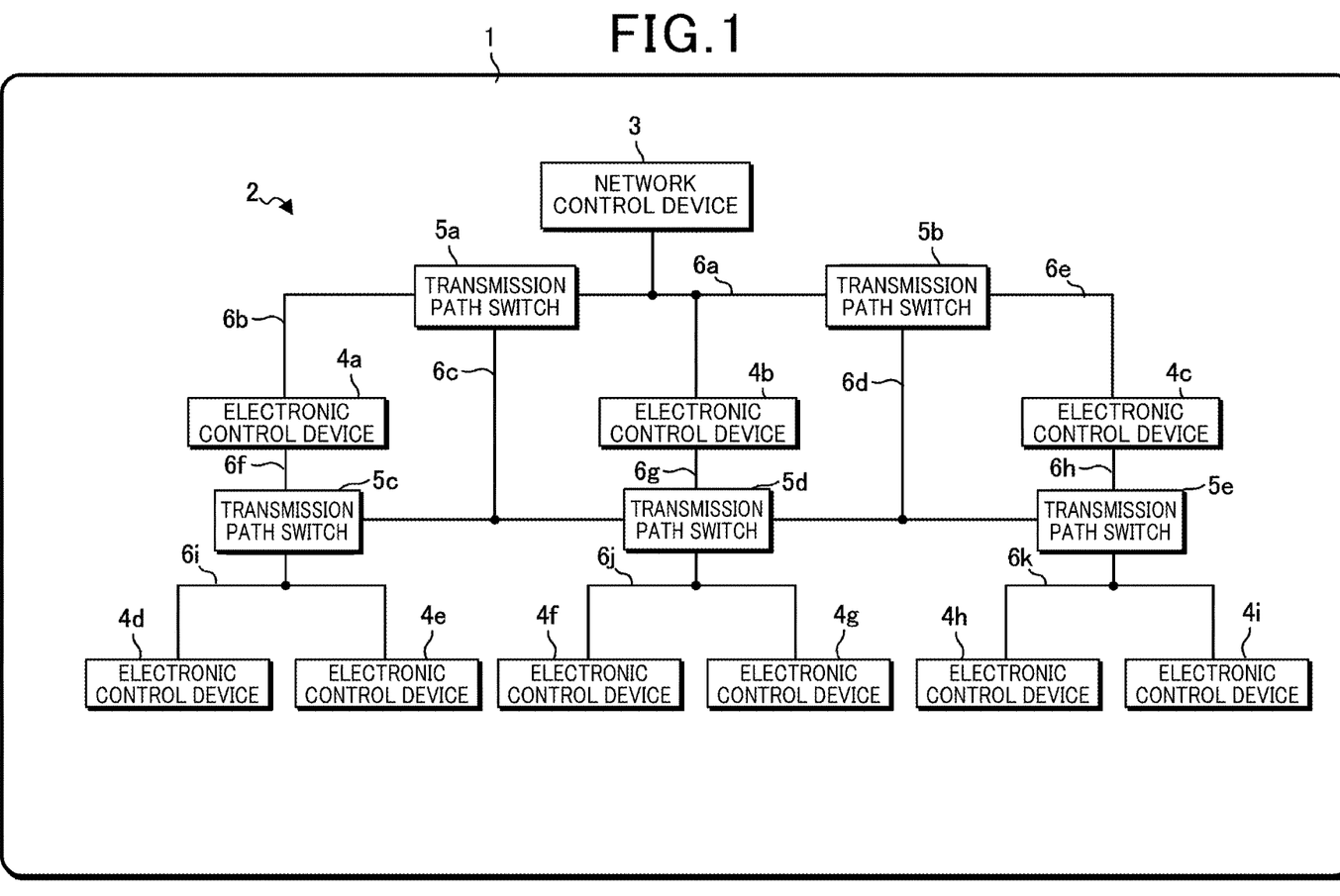
FIG. 1 is a diagram showing the configuration of an in-vehicle communication system according to an embodiment of the present invention.

FIG. 1 is a diagram showing the configuration of an in-vehicle communication system 2 equipped in a vehicle 1 according to an embodiment of the present invention. The in-vehicle communication system 2 includes a network control device 3, a plurality of electronic control devices 4a, 4b, 4c, 4d, 4e, 4f, 4g, 4h, 4i that control the operation of the vehicle 1, and transmission path switches 5a, 5b, 5c, 5d, 5e. Hereinafter, the electronic control devices 4a, 4b, 4c, 4d, 4e, 4f, 4g, 4h, 4i are collectively referred to as an electronic control device 4 also. Further, the transmission path switches 5a, 5b, 5c, 5d, 5e are collectively referred to as a transmission path switch 5 also.

Further, the in-vehicle communication system 2 includes a plurality of communication transmission paths 6a, 6b, 6c, 6d, 6e, 6f, 6g, 6h, 6i, 6j, 6k. Hereinafter, the communication transmission paths 6a, 6b, 6c, 6d, 6e, 6f, 6g, 6h, 6i, 6j, 6k are collectively referred to as a communication transmission path 6 also.

The transmission path switch 5 includes an open flow switch that follows an SDN technology. By an open flow control that follows the SDN technology and that is performed by the network control device 3, the transmission path switch 5 receives an instruction from the network control device 3, and switches the connection among a plurality of communication transmission paths 6 that are connected with the transmission path switch 5. Thereby, the in-vehicle communication system 2 keeps the flexibility and expansibility of the communication network that follows the SDN technology.

The network control device 3 manages the operation of the transmission path switch 5, and manages the communication among the network control device 3, the electronic control device 4 and the transmission path switch 5 in the in-vehicle communication system 2.

Figure 2:
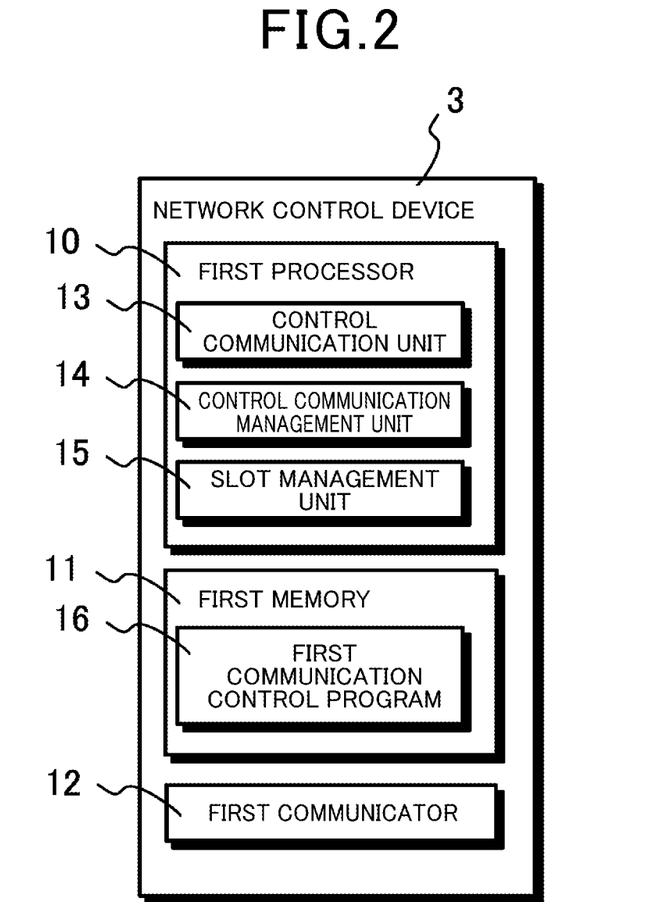
FIG. 2 is a diagram showing the configuration of a network control device.

FIG. 2 is a diagram showing the configuration of the network control device 3. The network control device 3 includes a first processor 10, a first memory 11 and a first communicator 12. For example, the first memory 11 is constituted by a volatile semiconductor memory and/or a non-volatile semiconductor memory. The first communicator 12 is a transceiver (transmitter/receiver, circuit) by which the network control device 3 communicates with the electronic control device 4 and the transmission path switch 5 through the communication transmission path 6.

For example, the first processor 10 is a computer that includes a central processing unit (CPU) and the like. The first processor 10 may be configured to include a ROM (Read Only Memory) in which programs are written, a random access memory (RAM) for temporary storage of data, and the like. The first processor 10 includes a control communication unit 13, a control communication management unit 14 and a slot management unit 15, as functional elements or functional units.

For example, the functional elements included in the first processor 10 are realized when the first processor 10 that is a computer executes a first communication control program 16 stored in the first memory 11. The first communication control program 16 can be stored in an arbitrary computer-readable storage medium. Instead, all or some of the functional elements included in the first processor 10 may be constituted by hardware devices each of which includes one or more electronic circuit components. The first processor 10 corresponds to the first computer in the present disclosure.

The control communication unit 13 executes an operation control of the transmission path switch 5, that is, a control communication for controlling a switching operation of the communication transmission path 6, with the transmission path switch 5 through the communication transmission path 6. As described above, in the embodiment, the control communication unit 13 controls the switching operation of the transmission path switch 5, by the open flow control that follows the SDN technology. That is, the control communication that is performed with the transmission path switch 5 by the control communication unit 13 can be an open flow message that follows an open flow protocol of the SDN technology.

Further, the control communication unit 13 sends information (for example, later-described slot management information) relevant to a communication operation in the electronic control device 4, and therefore executes a control communication with the electronic control device 4 also.

The control communication management unit 14 manages the operation of the control communication in the control communication unit 13. In the embodiment, particularly, the control communication management unit 14 manages the operation of the control communication unit 13, such that the control communication and the data communication are performed on the communication transmission path 6 in different time periods, in cooperation with a later-described data communication management unit 24 of the electronic control device 4.

Specifically, the control communication management unit 14 and the data communication management unit 24 manages the respective operations of the control communication unit 13 and a data communication unit 23 (described later), such that the control communication and data communication on the communication transmission path 6 are executed in mutually different time slots within a frame, the frame being a time period having a predetermined length. The data communication is a communication of a variety of data, and includes a communication of service data. The communication of service data is performed between the electronic control devices 4, for providing various services (or functions) relevant to the operation of the vehicle 1.

Figure 4:
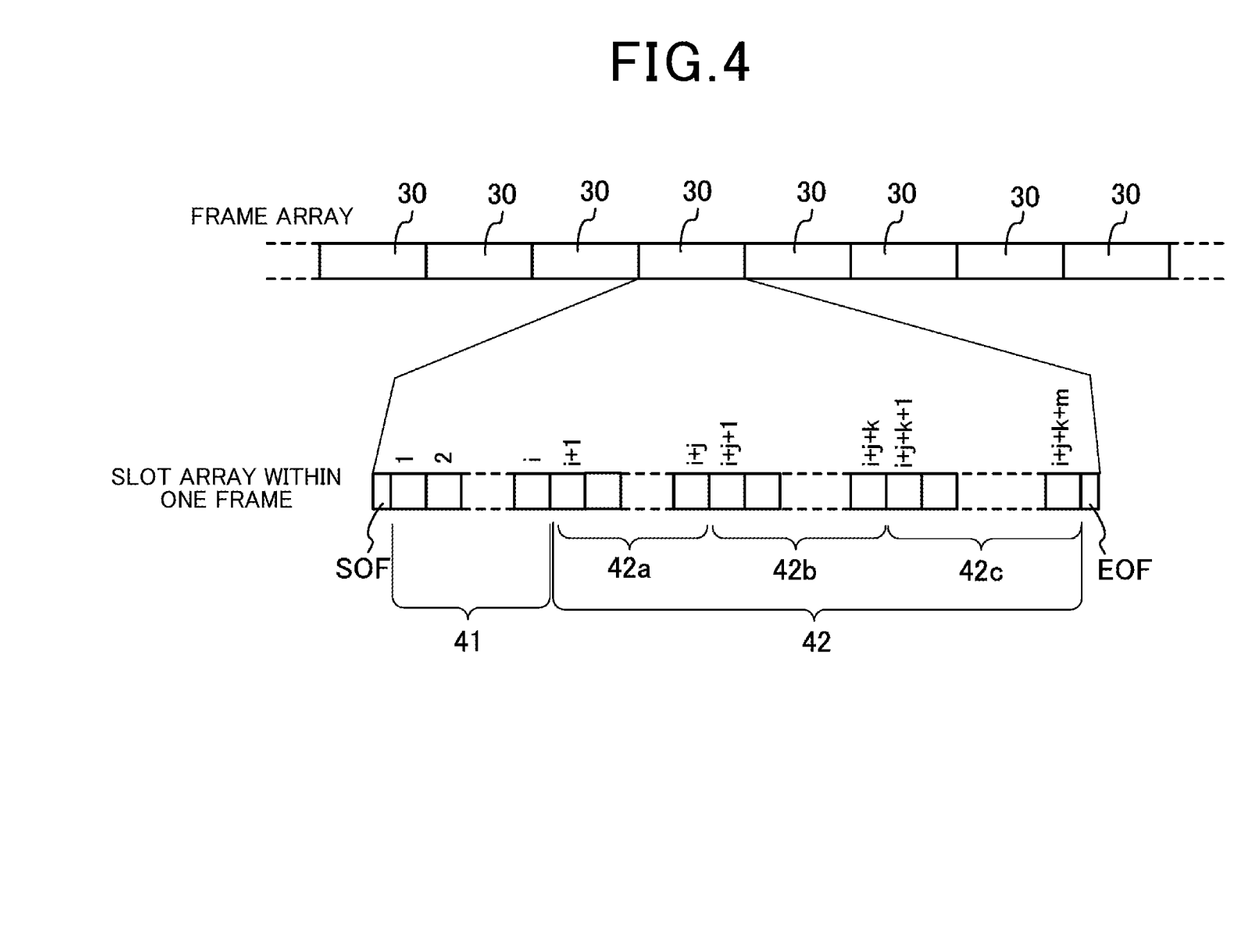
FIG. 4 is a diagram showing an exemplary time slot configuration of a frame that is used for communication.

FIG. 4 is a diagram showing an exemplary configuration of time slots included in a frame that is used in the embodiment. In FIG. 4, a frame array constituted by a plurality of frames 30 is shown at an upper stage in the figure, and a time slot array constituting one frame 30 is shown at a lower stage in the figure. In FIG. 4, it is assumed that time flows from the left to the right in the figure. That is, frames and slots shown on the left side in the figure are sent temporally earlier. In FIG. 4, a number is put at the upper side of each slot included in the slot array.

The frame 30 starts at a Start Of Frame (SOF) disposed at a temporal head at the left end in the figure, and ends at an End Of Frame (EOF) disposed at a temporal tail at the right end in the figure.

In the embodiment, the frame 30 includes a control time slot 41 for the control communication and a data time slot 42 for the data communication. In the example of the figure, the control time slot 41 is constituted by i time slots, and the data time slot 42 is constituted by (j+k+m) time slots. In the embodiment, the data time slot 42 is disposed temporally after the control time slot 41.

The number of time slots included in the control time slot 41 and the number of time slots included in the data time slot 42 may be previously set in the control communication management unit 14 and the data communication management unit 24 of the electronic control device 4. Alternatively, the number of time slots included in the control time slot 41 and the number of time slots included in the data time slot 42 may be decided by the control communication management unit 14, depending on the traveling state and peripheral situation of the vehicle 1, and the notice may be given to the electronic control device 4.

The control communication management unit 14 gives, to the control communication unit 13, control time slot information that is information about the number of time slots assigned to the control time slot 41. Further, the control communication management unit 14 manages the sending timing for the SOF indicating the start of the frame 30. For example, the control communication management unit 14 instructs the control communication unit 13 to send the SOF to the communication transmission path 6, at a predetermined time interval corresponding to the time length of the frame 30. After sending the SOF, the control communication unit 13 performs the control communication with the transmission path switch 5, using the i time slots assigned to the control time slot 41.

As described later, the data communication management unit 24 of the electronic control device 4 detects the start of the frame 30 by receiving the SOF from the communication transmission path 6. After receiving the SOF, the data communication management unit 24 sends, to the data communication unit 23 (described later), a sending start instruction indicating a timing to send a i+1-th time slot. The data communication unit 23 starts the data communication, in response to the receipt of the sending start instruction.

In the embodiment, as the time slot used for the communication of the service data, the data time slot 42 includes a single-purpose time slot 42a that is used exclusively for a single kind of service and a plural-purpose time slot 42b that is shared for plural kinds of services. Further, the data time slot 42 includes a general-purpose time slot 42c used for the communication of arbitrary data. The single-purpose time slot 42a, the plural-purpose time slot 42b and the general-purpose time slot 42c are constituted by j time slots, k time slots and m time slots, respectively.

In the embodiment, the single-purpose time slot 42a is disposed temporally earlier than the plural-purpose time slot 42b and the general-purpose time slot 42c, and next, the plural-purpose time slot 42b and the general-purpose time slot 42c are disposed in this order. For example, the single-purpose time slot 42a is used for the communication of the service data in a service with the highest processing priority, and for example, the plural-purpose time slot 42b is used for the communication in a service with a medium-level or lower processing priority. Thereby, in the service with the highest priority, without being influenced by the communication in another service, it is possible to rapidly perform the communication of the service data, and to realize a fast-response operation. Further, in services with medium-level or lower priorities, it is possible to share the communication time among the services, and to adjust execution times for the services.

Further, in the general-purpose time slot 42c, for example, the communication is freely performed for services having a variety of priorities. Thereby, in the case where the service data with different communication priorities is used in services, for example, it is possible to perform the communication of the service data with a high priority, in the single-purpose time slot 42a or the plural-purpose time slot 42b, and it is possible to perform the communication of the service data with a low priority, in the general-purpose time slot 42c. This enhances the flexibility and expansibility of the communication of the service data for each service in the data time slot 42.

The number of single-purpose time slots 42a provided in the data time slot 42 is one in the example shown in FIG. 4, but may be a plural number. By providing a plurality of single-purpose time slots 42a, for example, the single-purpose time slots 42a disposed temporally early can be used for a plurality of services, in an order from the highest priority, and therefore, operations in the plurality of services can be executed with fast-response properties corresponding to priorities.

With reference to FIG. 2, the slot management unit 15 instructs the electronic control device 4 to change the kind of the service for which the single-purpose time slot 42a or the plural-purpose time slot 42*b* is used, or to change the number of time slots that are included in the single-purpose time slot 42*a* or the plural-purpose time slot 42*b*, depending on the traveling state of the vehicle 1. For example, this instruction is performed when the slot management unit 15 sends, to the electronic control device 4, slot management information in which the kind of the service to be assigned and the number of time slots to be assigned are listed for each of the single-purpose time slot 42*a* and the plural-purpose time slot 42*b*. For example, in response to an instruction from the slot management unit 15, the control communication unit 13 sends the slot management information to the electronic control device 4, as a part of the control communication (that is, during the period of the control time slot 41).

For example, in the case where it is determined from the vehicle speed of the vehicle 1 that the vehicle 1 is traveling on an express highway, the slot management unit 15 can preferentially assign a service related to the manipulation operation of the vehicle 1, to the single-purpose time slot 42*a*. Alternatively, in the case where the service for the manipulation operation has already been assigned to the single-purpose time slot 42*a*, when the vehicle 1 is traveling on an express highway, the slot management unit 15 can decrease the number of time slots that are included in the plural-purpose time slot 42*b* or the general-purpose time slot 42*c*, and can increase the number of time slots that are included in the single-purpose time slot 42*a*. Thereby, for example, it is possible to enhance the fast-response property in the service for a manipulation operation that is particularly necessary on an express highway, by increasing the priority of the service for the manipulation operation and decreasing the communication speed for an entertainment-related service for which the plural-purpose time slot 42*b* is used and that is not relevant to the manipulation operation, as exemplified by a video service.

For example, when the vehicle 1 has stopped, the slot management unit 15 may instruct the electronic control device 4 to increase the number of time slots that are included in the plural-purpose time slot 42*b*, compared to when the vehicle 1 is traveling. Thereby, at the time of the stop of the vehicle 1, for example, it is possible to increase the communication speed for an entertainment-related service for which the plural-purpose time slot 42*b* is used, as exemplified by a video replay service, and to provide a high-definition replay video.

Further, depending on the state of the peripheral environment of the vehicle 1, the slot management unit 15 instructs the electronic control device 4 to change the kind of the service for which the single-purpose time slot 42*a* or the plural-purpose time slot 42*b* is used, or to change the number of time slots that are included in the single-purpose time slot 42*a* or the plural-purpose time slot 42*b*. Herein, "the state of the peripheral environment of the vehicle 1" can include, for example, the weather, the air temperature, and the number of traffic participants, such as vehicles and pedestrians, existing in the periphery.

Thereby, for example, in a situation where there are a large number of traffic participants and it is expected that the processing load for services related to the manipulation operation increases, it is possible to enhance the fast-response property and information throughput in the services related to the manipulation operation, by increasing the communication priorities and communication speeds for the services.

Figure 3:
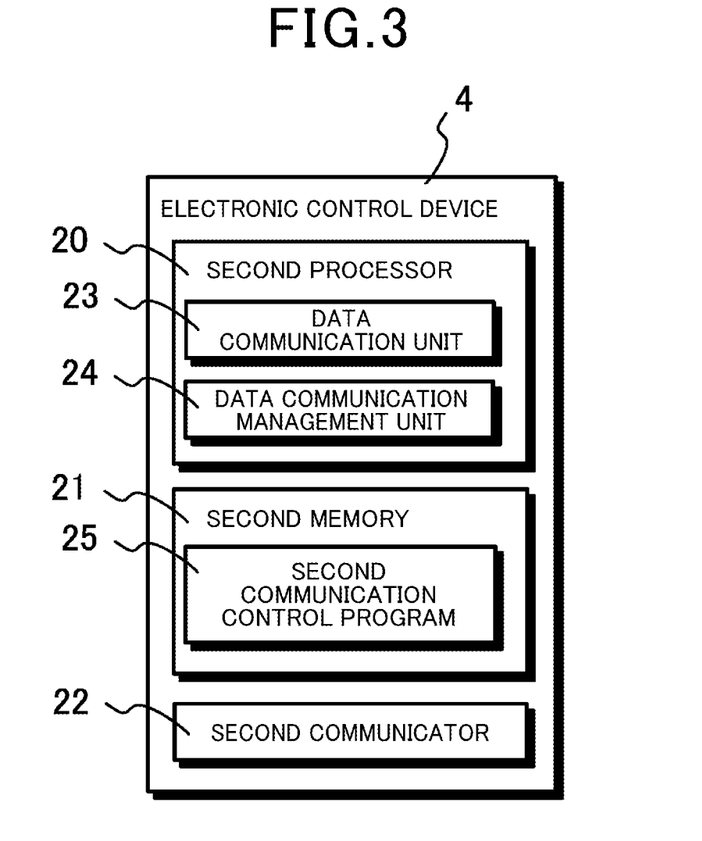
FIG. 3 is a diagram showing the configuration of an electronic control device.

FIG. 3 is a diagram showing the configuration of the electronic control device 4. For facilitating understanding of the invention, FIG. 3 shows only constituent elements relevant to the data communication that is performed by the electronic control device 4, but similarly to the related art, the electronic control device 4 can include a variety of functional elements or functional units for realizing predetermined services (or functions), or can include a variety of devices or electronic circuit components for realizing predetermined services (or functions).

The electronic control device 4 includes a second processor 20, a second memory 21 and a second communicator 22. For example, the second memory 21 is constituted by a volatile semiconductor memory and/or a non-volatile semiconductor memory. The second communicator 22 is a transceiver (transmitter/receiver, circuit) by which the electronic control device 4 communicates with the network control device 3 and other electronic control devices 4 through the communication transmission path 6.

For example, the second processor 20 is a computer that includes a CPU and the like. The second processor 20 may be configured to include a ROM in which programs are written, a RAM for temporary storage of data, and the like. The second processor 20 includes the data communication unit 23 and the data communication management unit 24, as functional elements or functional units.

For example, the functional elements included in the second processor 20 are realized when the second processor 20 that is a computer executes a second communication control program 25 stored in the second memory 21. The second communication control program 25 can be stored in an arbitrary computer-readable storage medium. Instead, all or some of the functional elements included in the second processor 20 may be constituted by hardware devices each of which includes one or more electronic circuit components. The second processor 20 corresponds to the second computer in the present disclosure.

Through the communication transmission path 6, the data communication unit 23 performs, with another electronic control device 4, a data communication for a data exchange for the operation of the vehicle 1. As described above, the data that is transmitted in the data communication includes service data that is transmitted between the electronic control devices 4 for providing various services (or functions) relevant to the operation of the vehicle 1.

The data communication management unit 24 manages the operation of the data communication unit 23. In the embodiment, particularly, the data communication management unit 24 manages the operation of the data communication unit 23, such that the data communication and the control communication are performed on the communication transmission path 6 in different time periods, in cooperation with the above-described control communication management unit 14 of the network control device 3. Specifically, the data communication management unit 24 manages the operation of the data communication unit 23, such that the communication of the service data is executed in a time slot assigned for each kind of the service.

More specifically, the data communication management unit 24 receives the slot management information sent from the network control device 3, and gives, to the data communication unit 23, a notice of a time slot assigned to a service that is performed by its device. Further, the data communication management unit 24 detects the start of the frame 30 by receiving the SOF sent by the network control device 3. After receiving the SOF, the data communication management unit 24 sends, to the data communication unit 23, the sending start instruction indicating the timing to send the i+l-th time slot. In response to the receipt of the sending start instruction, the data communication unit 23 performs the data communication using the time slot assigned to the service by its device.

In the in-vehicle communication system 2 having the above configuration, since the control communication and the data communication are executed in different time periods, it is not necessary to use a plurality of signal lines for the control communication and the data communication, unlike conventional communication systems using the SDN technology, and it is possible to configure the communication transmission path 6 using a single communication line or a single communication channel. Accordingly, in the in-vehicle communication system 2, it is possible to reduce the number of signal lines or communication channels of the communication transmission path 6 connecting the network control device 3, the electronic control device 4 and the transmission path switch 5, and to realize the in-vehicle communication system 2 at low cost, while enhancing the flexibility and/or expansibility of the communication network using the SDN technology.

Figure 5:
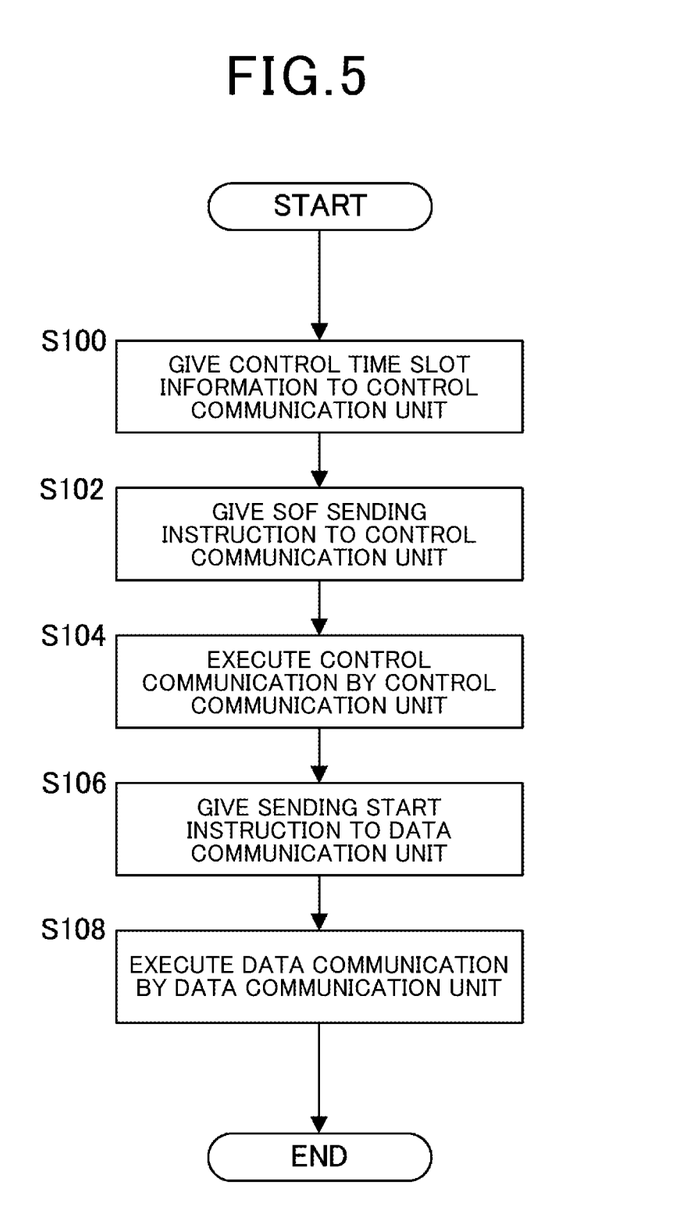
FIG. 5 is a flowchart showing a procedure of a process in the in-vehicle communication system.

Next, a procedure of the operation in the in-vehicle communication system 2 will be described. FIG. 5 is a flowchart showing the procedure of the process in the in-vehicle communication system 2. The process in FIG. 5 is repeatedly executed.

When the process starts, the control communication management unit 14 of the network control device 3 sends, to the control communication unit 13, the information (control time slot information) about the number of the time slots assigned to the control time slot 41, for managing the operation of the control communication in the control communication unit 13 (S100). Next, the control communication management unit 14 sends an SOF sending instruction to the control communication unit 13 (S102). Steps S100 and S102 correspond to the control communication management step.

Next, in response to the SOF sending instruction from the control communication management unit 14, the control communication unit 13 of the network control device 3 executes a control communication for controlling a communication path switching operation, with the transmission path switch 5 (S104). Step S104 corresponds to the control communication step.

Next, in each of the electronic control devices 4, the data communication management unit 24 sends the sending start instruction to the data communication unit, at the start timing for the data time slot 42 after the receipt of the SOF (S106). Subsequently, the data communication unit 23 of each of the electronic control devices 4 performs the data communication of a variety of data including the service data for the service that is performed by the electronic control device 4, in the period of the data time slot 42 (S108), and then, the process ends. Steps S106 and S108 correspond to the data communication management step and the data communication step, respectively.

That is, by steps S100 and S102 as the control communication management step and step S106 as the data communication management step, the operation in step S104 as the control communication step and the operation in step S108 as the data communication step are managed such that the control communication and the data communication are performed on the communication transmission path 6 in different time periods.

The present invention is not limited to the configuration of the above embodiment, and can be carried out as a variety of modes, without departing from the spirit.

The above-described embodiment supports the following configurations.

(Configuration 1) An in-vehicle communication system including: a plurality of electronic control devices equipped in a vehicle; a plurality of communication transmission paths; a transmission path switch that switches connection of the communication transmission paths; and a network control device that manages an operation of the transmission path switch, the network control device including: a control communication unit that executes a control communication with the transmission path switch through the communication transmission paths, the control communication being a communication for an operation control of the transmission path switch; and a control communication management unit that manages an operation of the control communication in the control communication unit, each of the electronic control devices including: a data communication unit that performs a data communication with another of the electronic control devices through the communication transmission paths, the data communication being a communication for a data exchange for an operation of the vehicle; and a data communication management unit that manages an operation of the data communication in the data communication unit, in which the control communication management unit and the data communication management unit manage the respective operations of the control communication unit and the data communication unit, such that the control communication and the data communication are performed on the communication transmission paths in different time periods.

According to the in-vehicle communication system in Configuration 1, it is possible to configure the communication transmission path using a single communication line or a single communication channel, and to realize the in-vehicle communication system at low cost, while enhancing the flexibility and/or expansibility of the communication network using the SDN technology, for example.

(Configuration 2) The in-vehicle communication system according to Configuration 1, wherein the control communication management unit and the data communication management unit manage the respective operations of the control communication unit and the data communication unit, such that the control communication and the data communication on the communication transmission paths are executed in mutually different time slots within a frame, the frame being a time period having a predetermined length.

According to the in-vehicle communication system in Configuration 2, it is possible to easily perform the control communication and the data communication in mutually different time periods.

(Configuration 3) The in-vehicle communication system according to Configuration 2, wherein the data communication includes a communication of service data, the communication of the service data being performed for the plurality of electronic control devices to provide a predetermined service relevant to the operation of the vehicle, and the data communication management unit manages the operation of the data communication unit, such that the communication of the service data is executed in a time slot that is assigned for each kind of the service.

According to the in-vehicle communication system in Configuration 3, since the time slot to be used is assigned for each kind of the service, it is possible to reduce the probability of the collision of communication data among services, and to enhance the reliability of the communication.

(Configuration 4) The in-vehicle communication system according to Configuration 3, wherein the time slot used for the communication of the service data in the data communication includes a single-purpose time slot and a plural-purpose time slot, the single-purpose time slot being used exclusively for a single kind of the service, the plural-purpose time slot being shared for plural kinds of the service.

According to the in-vehicle communication system in Configuration 4, it is possible to adjust execution times for services, for example, by assigning a service with the highest priority to the single-purpose time slot to provide a fast-response service and assigning another service with a medium-level or lower priority to the plural-purpose time slot.

(Configuration 5) The in-vehicle communication system according to Configuration 4, wherein the time slot used in the data communication includes a general-purpose time slot used for a communication of arbitrary data.

According to the in-vehicle communication system in Configuration 5, for example, in a service, service data with a low priority is assigned to the general-purpose time slot in an alternative or additional manner, and thereby, it is possible to realize the data communication having flexibility and expansibility for the service.

(Configuration 6) The in-vehicle communication system according to Configuration 4 or 5, wherein the network control device includes a slot management unit that instructs the electronic control devices to change the kind of the service for which the single-purpose time slot or the plural-purpose time slot is used, or to change the number of time slots that are included in the single-purpose time slot or the plural-purpose time slot, depending on a traveling state of the vehicle.

According to the in-vehicle communication system in Configuration 6, for example, in the case where it is determined from the vehicle speed of the vehicle 1 that the vehicle 1 is traveling on an express highway, it is possible to enhance the fast-response property in a service for a manipulation operation that is particularly necessary on an express highway, by increasing the priority of the service for the manipulation operation and decreasing the communication speed for an entertainment-related service that is not relevant to the manipulation operation, as exemplified by a video replay service.

(Configuration 7) The in-vehicle communication system according to Configuration 6, wherein when the vehicle has stopped, the slot management unit instructs the electronic control devices to increase the number of time slots that are included in the plural-purpose time slot, compared to when the vehicle is traveling.

According to the in-vehicle communication system in Configuration 7, at the time of the stop of the vehicle, for example, it is possible to increase the communication speed for an entertainment-related service for which the plural-purpose time slot is used, as exemplified by a video replay service, and to provide a high-definition replay video.

(Configuration 8) The in-vehicle communication system according to Configuration 6 or 7, wherein the slot management unit instructs the electronic control devices to change the kind of the service for which the single-purpose time slot or the plural-purpose time slot is used, or to change the number of time slots that are included in the single-purpose time slot or the plural-purpose time slot, depending on a state of a peripheral environment of the vehicle.

According to the in-vehicle communication system in Configuration 8, for example, in a situation where there are a large number of traffic participants and it is expected that the processing load for services related to the manipulation operation increases, it is possible to enhance the fast-response property and information throughput in the services related to the manipulation operation, by increasing the communication priorities and communication speeds for the services.

(Configuration 9) A communication control method in an in-vehicle communication system, the in-vehicle communication system including: a plurality of electronic control devices equipped in a vehicle; a plurality of communication transmission paths; a transmission path switch that switches connection of the communication transmission paths; and a network control device that manages an operation of the transmission path switch, the communication control method including: a control communication step in which a first computer included in the network control device executes a control communication with the transmission path switch through the communication transmission paths, the control communication being a communication for an operation control of the transmission path switch; a control communication management step in which the first computer manages an operation of the control communication in the control communication step; a data communication step in which a second computer included in each of the electronic control devices performs a data communication with another of the electronic control devices through the communication transmission paths, the data communication being a communication for a data exchange for an operation of the vehicle; and a data communication management step in which the second computer manages an operation of the data communication in the data communication step, in which, in the control communication management step and the data communication management step, the respective operations of the control communication and the data communication are managed, such that the control communication and the data communication are performed on the communication transmission paths in different time periods.

According to the communication control method in Configuration 9, it is possible to configure the communication transmission path using a single communication line or a single communication channel, and to realize the in-vehicle communication system at low cost, while enhancing the flexibility and/or expansibility of the communication network using the SDN technology, for example.

REFERENCE SIGNS LIST

1 . . . vehicle, 2 . . . in-vehicle communication system, 3 . . . network control device, 4, 4a, 4b, 4c, 4d, 4e, 4f, 4g, 4h, 4i . . . electronic control device, 5, 5a, 5b, 5c, 5d, 5e . . . transmission path switch, 6, 6a, 6b, 6c, 6d, 6e, 6f, 6g, 6h, 6i, 6j, 6k . . . communication transmission path, 10 . . . first processor, 11 . . . first memory, 12 . . . first communicator, 13 . . . control communication unit, 14 . . . control communication management unit, 15 . . . slot management unit, 16 . . . first communication control program, 20 . . . second processor, 21 . . . second memory, 22 . . . second communicator, 23 . . . data communication unit, 24 . . . data communication management unit, 30 . . . frame, 41 . . . control time slot, 42 . . . data time slot, 42a . . . single-purpose time slot, 42b . . . plural-purpose time slot, 42c . . . general-purpose time slot

What is claimed is:
1. An in-vehicle communication system including: a plurality of electronic control devices equipped in a vehicle; a plurality of communication transmission paths; a plurality of transmission path switches that switch connection of the communication transmission paths; and a network control device that manages an operation of each of the transmission path switches, wherein
- each of the plurality of transmission path switches for realizing SDN (Software-Defined Network), the plurality of communication transmission paths are connected to each other by each of the plurality of transmission path switches, and each of the plurality of transmission path switches receives an instruction from the network control device by an open flow control that follows an SDN technology performed by the network control device and switches connections between the plurality of communication transmission paths that are each connected with the corresponding transmission path switch,
- the network control device including a first processor, wherein the first processor:
  - executes a control communication with each of the transmission path switches through each of the communication transmission paths, the control communication being a communication for an operation control of each of the transmission path switches; and
  - manages an operation of the control communication,
- each of the electronic control devices including a second processor, wherein the second processor:
  - performs a data communication with another of the electronic control devices through each of the communication transmission paths, the data communication being a communication for a data exchange for an operation of the vehicle; and
  - manages an operation of the data communication in the data communication unit,
- the first processor and the second processor manage the respective operations of the control communication and the data communication, such that the control communication and the data communication are performed on the communication transmission paths in different time periods,
- the first processor and the second processor manage the respective operations of the control communication and the data communication, such that the control communication and the data communication on the communication transmission paths are executed in mutually different time slots within a frame, the frame being a time period having a predetermined length,
- the data communication includes a communication of service data, the communication of the service data being performed for the plurality of electronic control devices to provide a predetermined service relevant to the operation of the vehicle,
- the second processor manages the operation of the data communication, such that the communication of the service data is executed in a time slot that is assigned for each kind of the service,
- the time slot used for the communication of the service data in the data communication includes a single-purpose time slot and a plural-purpose time slot, the single-purpose time slot being used exclusively for a single kind of the service, the plural-purpose time slot being shared for plural kinds of the service, and
- the first processor changes a service preferentially assigned to the single-purpose time slot depending on a traveling state of the vehicle or a state of a peripheral environment of the vehicle, and changes the kind of the service for which each of the single-purpose time slot and the plural-purpose time slot is used, and changes a number of time slots that are included in each of the single-purpose time slot and the plural-purpose time slot, depending on the traveling state of the vehicle.

2. The in-vehicle communication system according to claim 1, wherein
- when the vehicle has stopped, the first processor instructs the electronic control devices to increase the number of time slots that are included in the plural-purpose time slot, compared to when the vehicle is traveling.

3. The in-vehicle communication system according to claim 1, wherein
- the time slot used in the data communication includes a general-purpose time slot used for a communication of arbitrary data.

4. A communication control method in an in-vehicle communication system, the in-vehicle communication system including: a plurality of electronic control devices equipped in a vehicle; a plurality of communication transmission paths; a plurality of transmission path switches that switches connection of the communication transmission paths; and a network control device that manages an operation of each of the transmission path switches, wherein
- each of the plurality of transmission path switches is an open flow switch for realizing SDN (Software-Defined Network), the plurality of communication transmission paths are connected to each other by each of the plurality of transmission path switches, and each of the plurality of transmission path switches receives an instruction from the network control device by an open flow control that follows an SDN technology performed by the network control device and switches connections between the plurality of communication transmission paths that are each connected with the corresponding transmission path switch,
- the communication control method comprising:
- a control communication step in which a first computer included in the network control device executes a control communication with each of the transmission path switches through each of the communication transmission paths, the control communication being a communication for an operation control of each of the transmission path switches;
- a control communication management step in which the first computer manages an operation of the control communication in the control communication step;
- a data communication step in which a second computer included in each of the electronic control devices performs a data communication with another of the electronic control devices through each of the communication transmission paths, the data communication being a communication for a data exchange for an operation of the vehicle; and
- a data communication management step in which the second computer manages an operation of the data communication in the data communication step, wherein
- in the control communication management step and the data communication management step, the respective operations of the control communication and the data communication are managed, such that the control communication and the data communication are performed on the communication transmission paths in different time periods,
- in the control communication management step and the data communication management step, the respective operations of the control communication and the data communication, such that the control communication and the data communication on the communication transmission paths are executed in mutually different time slots within a frame, the frame being a time period having a predetermined length, the data communication includes a communication of service data, the communication of the service data being performed for the plurality of electronic control devices to provide a predetermined service relevant to the operation of the vehicle, the second computer manages the operation of the data communication, such that the communication of the service data is executed in a time slot that is assigned for each kind of the service, the time slot used for the communication of the service data in the data communication includes a single-purpose time slot and a plural-purpose time slot, the single-purpose time slot being used exclusively for a single kind of the service, the plural-purpose time slot being shared for plural kinds of the service, and the first computer changes a service preferentially assigned to the single-purpose time slot depending on a traveling state of the vehicle or a state of a peripheral environment of the vehicle, and changes the kind of the service for which each of the single-purpose time slot and the plural-purpose time slot is used, and changes a number of time slots that are included in each of the single-purpose time slot and the plural-purpose time slot, depending on the traveling state of the vehicle.

\* \* \* \* \*